UNITED STATES PATENT OFFICE.

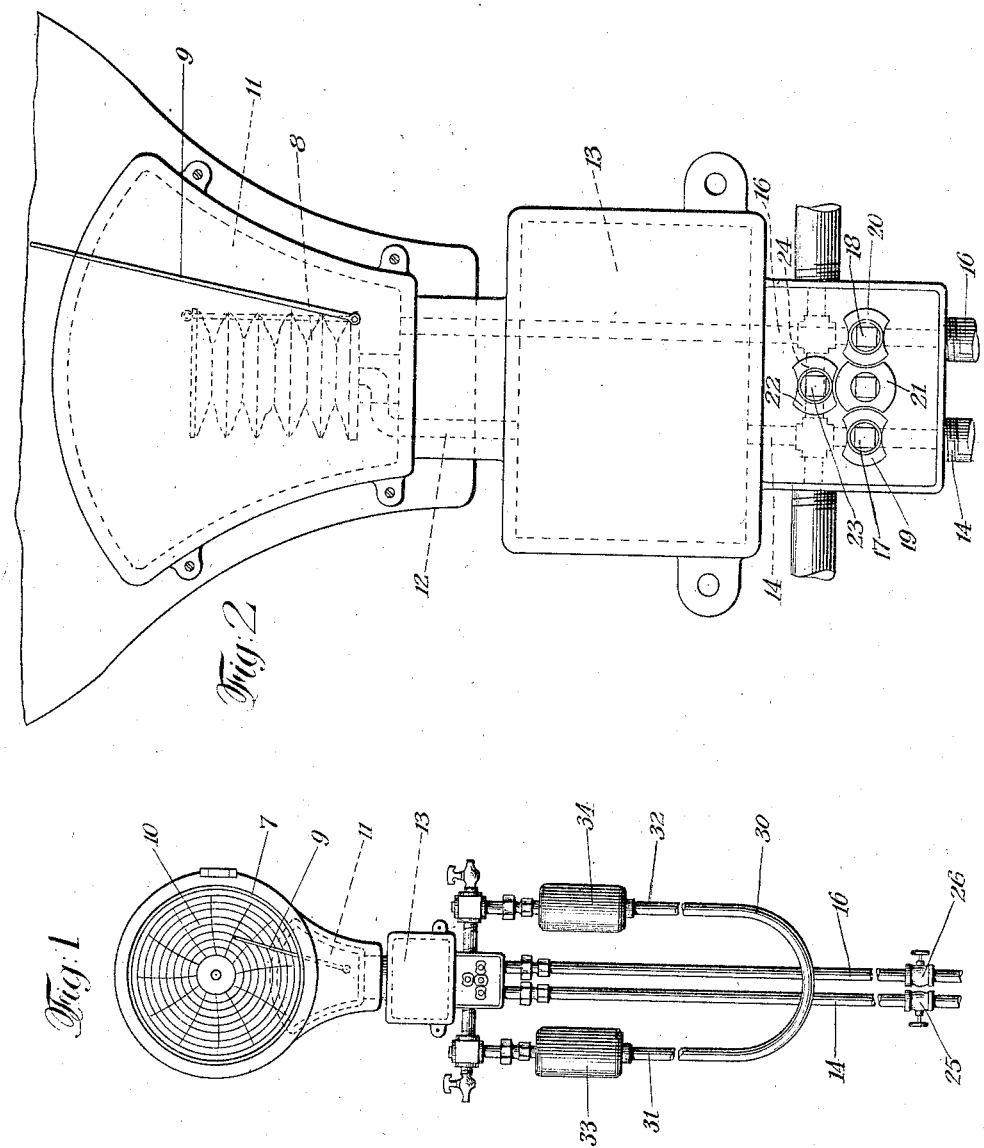

WILLIAM H. BRISTOL, OF WATERBURY, CONNECTICUT.

DIFFERENTIAL-PRESSURE GAGE.

1,003,229. Specification of Letters Patent. Patented Sept. 12, 1911.

Application filed April 3, 1911. Serial No. 618,497.

*To all whom it may concern:*

Be it known that I, WILLIAM H. BRISTOL, a citizen of the United States, and a resident of Waterbury, in the county of New Haven and State of Connecticut, have invented certain new and useful Improvements in Differential-Pressure Gages, of which the following is a specification.

The invention relates to apparatus for indicating or recording differential pressures, and more particularly to means adapted to safeguard the actuating mechanism for the indicating or recording arm against excessive differences of pressure.

It has for its object to so protect the operating mechanism, which is usually sensitive and designed to withstand only small differences of pressure in comparison to the static pressures whose difference is to be indicated or recorded, that the subjecting of the gage as a whole to either of the said static pressures, will not destroy the operating mechanism or in any way impair its sensitiveness.

The nature of the invention will be best understood when described in connection with the accompanying drawings, in which—

Figure 1 is an elevation of a differential pressure gage with the safeguarding apparatus attached. Fig. 2 is a fragmentary detail view.

Similar characters of reference designate corresponding parts throughout the several views.

Referring now to the drawings, 7 designates a differential pressure gage of the type in which the actuating mechanism 8, for an indicating or recording arm 9 adapted to move over a record sheet 10, is surrounded by a sealed pressure casing forming a chamber 11. This chamber communicates through a passage-way 12 with an auxiliary pressure casing forming a chamber 13. The combined volume of the auxiliary pressure chamber 13 and the actuating mechanism 8 is made substantially equal to that of the pressure chamber 11. Thus, when the two static pressures are admitted to the same, approximately equal times will be required to completely fill the said chambers 11, and the actuating mechanism 8 and chamber 13, with the fluid under pressure and prevent the temporary establishment of an excessive difference which would result from a lag of one of the pressures in attaining its working condition. To said auxiliary chamber 13 one of the fluids under pressure is conducted through a suitable pipe 14, and is further communicated through the passage-way 12 to the actuating mechanism 8. The other fluid under pressure is conducted through a suitable pipe 16, passing through auxiliary chamber 13, directly into the chamber 11. The actuating mechanism 8, as a rule and to provide a sufficiently sensitive gage, is not designed to withstand any great difference of pressure, such as might exist were it subjected to but one of the static pressures whose difference it is desired to indicate or record. That is to say, that while the actual differences of pressure to be indicated or recorded may vary from 5 or 10 lbs. for example, yet the actual static pressures producing such differences might be very considerable; and, if admitted to either side of the gage only, would destroy the said actuating mechanism. To obviate such contingency, it has been proposed to interlock the inlet valves 17 and 18 for the pipes 14 and 16 respectively. To this end the said valves are provided with interlocking members 19 and 20, respectively interlocking with opposite sides of a member 21. The member 21 interlocks with a member 22 of a valve 23 normally maintaining open a pipe connection 24 between the two pipes 14 and 16. It will be noted that both of the valves 17 and 18 must be opened before the member 21 can be turned; and, until this member can be turned, member 22 of valve 23 must remain in the position shown and in which the two inlet pipes 14 and 16 communicate with each other through the pipe 24. When both inlet valves 17 or 18 are opened (the working condition for the differential pressure gage) member 22 may be turned to close the valve 23, whereby the fluids under pressure will be admitted respectively to the chamber 11 and to the actuating mechanism 8 and its chamber 13. As it is equally necessary in shutting off the pressures that both be turned off simultaneously, the reverse operations must be effected. That is to say, valve 23 is opened turning member 22 back into its normal position, as shown in the drawing. Member 21 may then be turned back into normal position and the valves 17 and 18 closed. It is thus impossible to close these said valves without first opening the valve 23. It might occur, however, that the pressure of the fluid admitted through one or the other pipes 14 or 16 would be turned off in some way at the gage; or, at some distant point, for example through the closing of a valve 25 or 26 entirely removed from the differential pressure gage. Or, the pressure of one of the fluids might decrease excessively. The aforesaid interlocking mechanism would, in such event be of no avail. Other causes might, furthermore, contribute to the establishment of an excessive fluid pressure solely in the chamber 11 or in the actuating mechanism 8, as a sudden pulsation in one of the static pressures. To provide against any such contingency and to positively protect the pressure gage, whether the same be provided with interlocking mechanism as before described or not, and to allow of the pressure being turned on successively, the following means have been provided. A U-tube 30 of sufficient length, is partly filled with a suitable liquid such as mercury, the head of liquid being suited to the range of the actuating mechanism. The legs 31 and 32 of said U-tube are preferably provided with enlargements 33 and 34 respectively, and the tube is connected to by-pass the inlet pipes 14 and 16. The leg 31 connects with inlet pipe 14 and the leg 32 with the inlet pipe 16 beyond the respective valves 17 and 18 and the valve 23. In case either of the valves 17 or 18 could by any means be opened without the other, or if the connections to the gage are opened and one should be closed without the other, the excessive pressure existing in the one would equalize itself through the U-tube 30, the liquid therein being forced up into the corresponding enlargement. Any other serious disturbance of the static pressures would be similarly equalized.

I claim:—

1. The combination with a differential pressure gage including suitable actuating mechanism adapted to be subjected to two pressures, and means to admit fluid under said pressures to the gage; of pressure regulating means to automatically afford communication between the fluid admission means to equalize the pressures, to which the actuating mechanism is subjected, when the difference between the two said pressures exceeds a determined amount.

2. The combination with a differential pressure gage comprising a sealed casing forming a pressure chamber, actuating mechanism within said chamber, means to admit fluid under pressure to said pressure chamber, and means to admit fluid under pressure to said actuating mechanism; of pressure regulating means communicating with both of said fluid admission means and adapted to automatically equalize the pressure between the same when the difference between the pressures existing in said fluid admission means exceeds a determined amount.

3. The combination with a differential pressure gage comprising a sealed casing forming a pressure chamber, actuating mechanism within said chamber, means to admit fluid under pressure to said pressure chamber, and means to admit fluid under pressure to said actuating mechanism; of a U-tube containing a suitable liquid, one leg of which tube communicates with one of said fluid admission means, and the other leg with the other of said fluid admission means.

4. The combination with a differential pressure gage comprising a sealed casing forming a pressure chamber, actuating mechanism within said chamber, means to admit fluid under pressure to said pressure chamber, and means to admit fluid under pressure to said actuating mechanism; of a U-tube containing a suitable liquid, each leg of said tube being provided with an enlarged portion, and one leg communicating with one of said fluid admission means, and the other leg with the other said fluid admission means.

5. The combination with a differential pressure gage comprising a sealed casing forming a pressure chamber, actuating mechanism within said chamber, means to admit fluid under pressure to said pressure chamber, means to admit fluid under pressure to said actuating mechanism, and a valve in each of said fluid admission means; of pressure regulating means communicating on the discharge side of said valves with both of said fluid admission means and adapted to equalize the pressure between the same when the difference between the pressures existing in said fluid admission means exceeds a determined amount.

6. The combination with a differential pressure gage comprising a sealed casing forming a pressure chamber, actuating mechanism within said chamber, means to admit fluid under pressure to said pressure chamber, an auxiliary casing forming a pressure chamber communicating with said actuating mechanism, the combined volume of said auxiliary pressure chamber and said actuating mechanism being substantially equal to the volume of said sealed pressure chamber, and means to admit fluid under pressure to said auxiliary pressure chamber; of pressure regulating means communicating with both of said fluid admission means and adapted to equalize the pressure between the same when the difference between the pressure existing in said fluid admission means exceeds a determined amount.

Signed at New York, in the county of New York and State of New York this 30 day of March A. D. 1911.

WILLIAM H. BRISTOL.

Witnesses
   LAURA E. SMITH,
   FREDK. F. SCHUETZ.